United States Patent Office 3,030,178
Patented Apr. 17, 1962

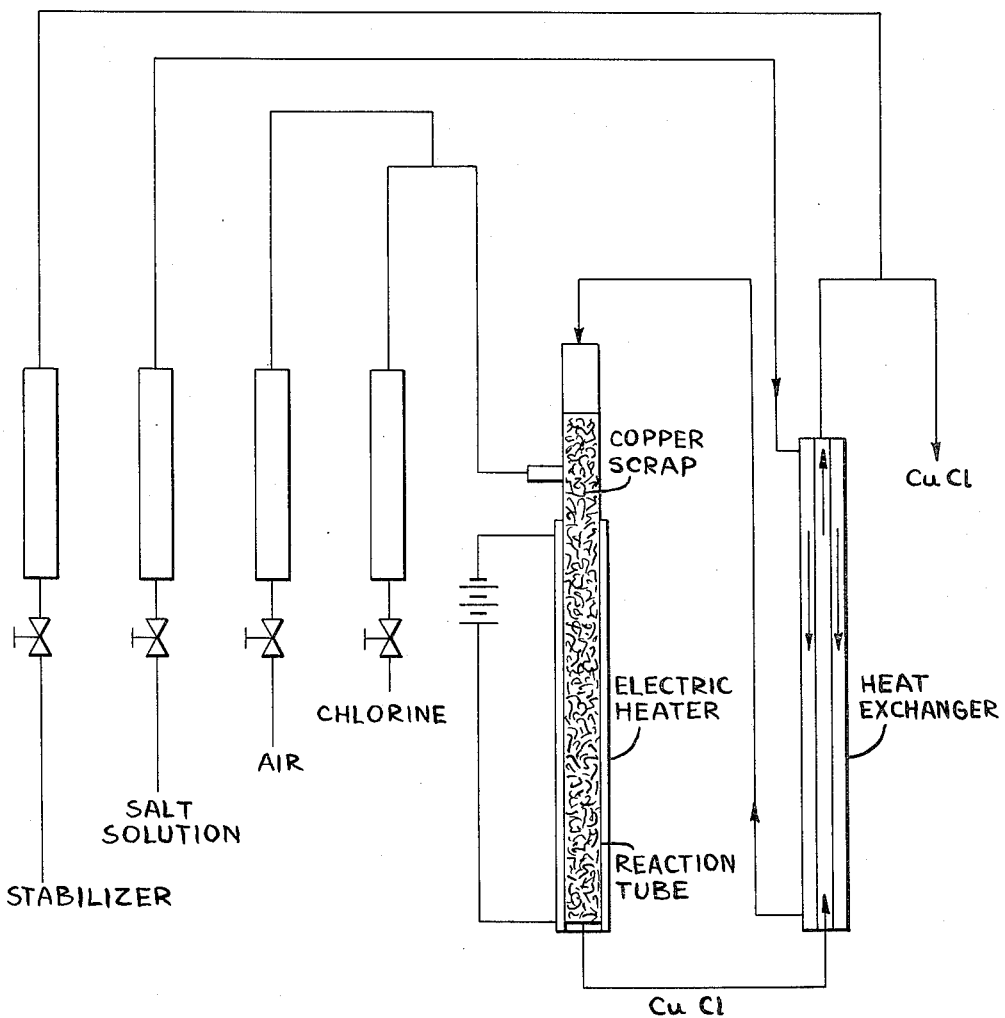

3,030,178
PROCESS FOR CONTINUOUS PRODUCTION
OF CUPROUS CHLORIDE
Horst Niemann and Kurt Herrmann, Wolfenbuttel, Germany, assignors to Schering A.G., Berlin, Germany, a corporation of Germany
Filed Nov. 27, 1959, Ser. No. 855,543
Claims priority, application Germany Dec. 15, 1958
6 Claims. (Cl. 23—97)

This invention relates to a novel process for the continuous production of chlorides of copper. More particularly, the invention is concerned with the production of cuprous or cupric chloride solutions by oxidation of copper with chlorine.

Cuprous chloride is extensively used in industry. It is produced either by the reduction of cupric chloride, or by the oxidation of copper with chlorine. The reduction of cupric chloride is carried out by treating solutions thereof with sulfur dioxide, additions of sulfites, treatment with hydrogen and hydrochloric acid at elevated temperature, or by boiling with finely divided copper in presence of hydrochloric acid or common salt.

All the foregoing methods have the disadvantage of being non-continuous. The reduction of cupric chloride by boiling or warming with copper consumes considerable amounts of energy and time. Furthermore, this method requires finely divided copper such as wire, cuttings, granulations, and the like, and for this reason any copper scrap that is to be used must be correspondingly finely divided. In addition, the hot cuprous chloride solution must be cooled before further processing, which is costly and time-consuming. Furthermore, this method because of its non-continuous character, requires a large investment in apparatus because the reaction vessels have to be of correspondingly large dimensions.

The drawing is a diagrammatic view showing the operation of the process.

In accordance with this invention, it has been found that cuprous chloride solutions can be prepared in a continuous process by providing a reaction vessel, open at the top, advantageously a vertical tube, which is filled with copper, preferably in the form of copper scrap, and hydrochloric acid and/or alkali metal chloride or alkaline earth metal chloride solution, and introducing chlorine into said vessel. Copper is either periodically or continuously introduced into the upper opening of the reaction vessel, e.g. the tube. If desired, the chlorine may be admixed with air prior to its introduction, in order to displace cupric chloride crystals as they form and to avoid blocking of the apparatus by cupric chloride crystals. Nitrogen is insoluble in the reaction mixture in the tube. The chlorination takes place odorlessly.

That portion of the tube located below the chlorine inlet, designated herein as a reduction zone, is heated so that the solution present in this portion is maintained at a temperature just under the boiling point. At this temperature the cupric chloride solution originally formed is reduced to cuprous chloride solution by the metallic copper. If hydrochloric acid and/or alkali metal chloride or alkaline earth chloride solution is allowed to flow at constant velocity into the head end of the tube, and if the lower end of the tube is provided with a bent exit tube, the cuprous chloride solution will flow out of this exit tube.

The height at which the chlorine should be introduced into the reaction tube is determined by the size of the plant, velocity of introduction, and other factors, and can readily be determined empirically by the skilled operator in accordance with the basic principles of the reaction. The height can be, for example, 50 to 100 centimeters below the surface of the liquid, i.e. in a tube of 3 meters length and 200 mm. diameter, at about ⅔ of its height.

By passing the outflowing, hot cuprous chloride solution through a heat exchanger, countercurrent to the stream of solution flowing into the top of the reaction tube, the cuprous chloride solution can be adjusted to near room temperature, and the hydrochloric acid or alkali metal chloride solution is added to the reaction tube at a temperature which lies about 20–30° C. below the operating temperature of the tube. The outflowing cuprous chloride solution is colorless and contains 100% of the copper in the cuprous form. The cuprous chloride solution leaving the heat exchanger may, if desired, be immediately treated continuously with a small amount of a stabilizer, such, for example, sulfur dioxide, sodium sulfite, and the like. Cuprous chloride solutions stabilized in this manner possess good keeping qualities and can readily be handled. Cuprous chloride can be precipitated therefrom by addition of water, and other cuprous compounds can be prepared by employing conventional methods. The transformation or conversion of the cuprous chloride to other cuprous compounds can be carried out in such a manner that the residual alkali metal or alkaline earth metal chloride solutions can be reused after separation from the insoluble cuprous compounds and from an excess of the precipitating agent.

As examples of alkali metal chlorides suitable for the process of the invention there may be mentioned sodium, potassium, lithium, caesium and rubidium chlorides. Suitable alkaline earth metal chlorides are calcium, barium, and strontium chlorides.

The novel continuous process of the present invention exhibits numerous advantages compared with known methods. Thus, chlorination of copper to cupric chloride and reduction of the latter to cuprous chloride is carried out in one apparatus and in a single operation. The apparatus required can be kept relatively clean, permitting greatly increased throughput.

By reason of the fact that the chlorination and the reduction are carried out simultaneously in a single piece of equipment, it is possible to utilize the available heat generated by the strongly exothermic chlorination economically for the heating of the cupric chloride solution flowing through the reduction zone. By the use of a heat exchanger, the heat balance is so favorable that the heating of the reduction zone not only serves as a means of heating the reaction tube but also for equalizing the flow of heat which can thereby be maintained within narrow limits.

A constant concentration of cuprous chloride in the discharging solution can readily be achieved through the use of regulatory equipment, for example, rotameters and the like, which facilitate a simultaneous addition of chlorine and of salt solution.

The concentration of cuprous chloride in the solution can be varied within a wide range by variation of the amount of chlorine gas and of the amount of hydrochloric acid or alkali metal chloride solution flowing through the reaction tube in a given period of time, the maximum limit of the concentration of cuprous chloride being determined solely by its solubility in the reaction stream. Particularly there can be produced for any specific application of the cuprous chloride solution either weakly or strongly acid solutions which may or may not contain alkali metal chlorides or alkaline earth metal chlorides.

In the continuous process, copper scrap may be employed without further processing such as cutting or grinding. Even copper ingots of considerable size can successfully be charged, an economic advantage possessed by no hitherto known process. The performance of the reduction zone is determined by the surface area of the copper located therein and by the residence time within the zone of the solution which is to be reduced. The performance of the reduction zone can also be varied within wide limits in relation to the copper charged by the use of a longer or shorter reduction tube. A shorter reduction zone can be used when employing mixed copper scrap, which consists of wire, foil, strip, and sheets, if during the periodic charging of the tube with copper scrap the large scrap pieces are retained in the chlorination zone by suitable apparatus. Such suitable apparatus includes any equipment which is capable of holding back in the chlorination zone the larger pieces of scrap such as light sheets, electrode materials, and the like, while at the same time permitting unhampered passage of the more finely divided reduction material. The apparatus should also not restrict the free flow of liquid across the area of the chlorination zone and the diameter of the reaction tube.

*Example 1*

There was employed as a reaction tube a Duran glass tube 3.20 meters in length and 200 mm. in diameter. The bottom opening of this tube was connected with a heat exchanger. The chlorine inlet opening was located 1.10 meters below the upper end of the tube, and the portion of the reaction tube located below the chlorine inlet opening was electrically heated. The temperature was controlled by a thermostat. The reaction tube was insulated. The reaction tube was filled to the top with miscellaneous copper scrap such as wire, strips of foil, and the like. After the reaction tube had been filled with salt solution (300 g. Nacl+0.5 g. HCl/l.) to the overflow point of the heat exchanger, the heater was started. As soon as the liquid in the reduction zone reached a temperature of 100° C., there was introduced into the reaction tube through the heat exchanger salt solution at the rate of 80 liters per hour and simultaneously there were introduced 1150 liters per hour of chlorine gas mixed with some air for the chlorination of the copper.

Additional copper scrap was added through the upper end of the reaction tube at intervals of 30–60 minutes. The chlorination proceeds without difficulty, nor do any problems arise by reason of either the chlorine or the salt solution. The cuprous chloride solution discharged from the heat exchanger was completely colorless, the cuprous chloride content rising in the course of about two hours to 155 g./l. and then remaining almost constant. The deviations are less than 1%. The solutions are always completely reduced. Shortly after discharge from the heat exchanger, the cuprous chloride solution was continuously treated with three grams of sodium sulfite and collected in a receiver. The solution did not crystallize at room temperature.

We claim:

1. A process of continuously preparing a cuprous chloride solution substantially free of cupric chloride which comprises distributing metallic copper through a reaction zone having a lower portion and an upper portion superimposed on said lower portion and freely communicating therewith, said upper portion having a top part removed from said lower portion and a bottom part adjacent said lower portion;

continuously feeding to said top part an aqueous solution of hydrochloric acid and of a chloride selected from the group consisting of alkali metal chlorides and alkaline earth metal chlorides;

continuously feeding to said bottom part a stream of gaseous chlorine for reaction of said chlorine with the metallic copper in said upper portion, said aqueous solution being fed to said top part at a rate sufficient to keep said reaction zone filled with liquid, whereby a solution of cupric chloride is formed in said upper portion, maintaining the temperature of said lower portion near the boiling point of the liquid contained therein, and continuously withdrawing liquid from said lower portion, whereby said cupric chloride solution is passed from said upper portion to said lower portion for reaction with the metallic copper in the lower portion, said liquid being withdrawn at a rate sufficient for substantially complete reduction of said cupric chloride to cuprous chloride by said copper in said lower portion, whereby the liquid withdrawn from said lower portion is substantially free of cupric chloride.

2. A process according to claim 1, wherein said lower portion has a bottom part remote from said upper portion, and said liquid substantially free of cupric chloride is withdrawn from said bottom part of said lower portion.

3. A process according to claim 1, wherein said hydrochloric acid and said chloride are present in said aqueous solution in amounts sufficient to keep the cuprous chloride contained in said withdrawn liquid in solution in the same.

4. A continuous process of preparing a cuprous chloride solution substantially free of cupric chloride which comprises distributing metallic copper throughout a reaction zone having a lower portion and a superimposed upper portion, said upper portion having a bottom part adjacent said lower portion;

continuously feeding a stream of gaseous chlorine to said bottom part;

continuously feeding free hydrochloric acid and a chloride selected from the group consisting of alkali metal chlorides and alkaline earth metal chlorides to said upper portion in aqueous solution, heating the reaction zone to a temperature near the boiling point of the liquid contained in the reaction zone, and continuously withdrawing the resultant cuprous chloride solution from the lower portion of the reaction zone.

5. A process according to claim 3, wherein air is fed to said upper portion jointly with said chlorine.

6. A process according to claim 1, wherein additional metallic copper is added to said reaction zone when a portion of the copper in said zone is consumed by reaction with said chlorine and said cupric chloride.

References Cited in the file of this patent

UNITED STATES PATENTS

| 1,763,781 | Heath et al. | June 17, 1930 |
| 1,964,569 | Gernes | June 26, 1934 |
| 2,046,937 | Curtin | July 7, 1936 |
| 2,049,402 | Wernlund | July 28, 1936 |
| 2,367,153 | Swinehart et al. | Jan. 9, 1945 |
| 2,586,579 | Supiro | Feb. 19, 1952 |

FOREIGN PATENTS

| 395,434 | Germany | May 17, 1924 |
| 413,401 | Germany | May 8, 1925 |

OTHER REFERENCES

Mellor: "Comprehensive Treatise on Inorganic and Theoretical Chemistry," vol. 3, pages 157–158 (1923), Longmans, Green and Co., N.Y.